United States Patent
Lange (10) Patent No.: US 10,355,769 B2
(45) Date of Patent: *Jul. 16, 2019

(54) NARROWBAND SIGNAL TRANSPORT SUB-SYSTEM FOR DISTRIBUTED ANTENNA SYSTEM

(71) Applicant: CommScope Technologies LLC, Hickory, NC (US)

(72) Inventor: Keld Knut Lange, Oetisheim (DE)

(73) Assignee: CommScope Technologies LLC, Hickory, NC (US)

( * ) Notice: Subject to any disclaimer, the term of this patent is extended or adjusted under 35 U.S.C. 154(b) by 38 days.

This patent is subject to a terminal disclaimer.

(21) Appl. No.: 15/620,307

(22) Filed: Jun. 12, 2017

(65) Prior Publication Data

US 2017/0279517 A1 Sep. 28, 2017

Related U.S. Application Data

(63) Continuation of application No. 14/540,375, filed on Nov. 13, 2014, now Pat. No. 9,680,556.

(Continued)

(51) Int. Cl.
*H04W 88/08* (2009.01)
*H04B 7/155* (2006.01)

(52) U.S. Cl.
CPC ......... *H04B 7/15507* (2013.01); *H04B 7/155* (2013.01)

(58) Field of Classification Search
CPC .............. H04W 88/085; H04W 52/146; H04B 7/15507; H04B 7/15571
See application file for complete search history.

(56) References Cited

U.S. PATENT DOCUMENTS 6,223,021 B1 4/2001 Silvia et al.
6,785,558 B1 8/2004 Stratford et al.
(Continued)

FOREIGN PATENT DOCUMENTS

WO 2012168926 12/2012
WO 2014026005 2/2014

OTHER PUBLICATIONS

United States Patent and Trademark Office, "Notice of Allowance", "From U.S. Appl. No. 14/540,375", dated Feb. 7, 2017, pp. 1-14, Published in: US.

(Continued)

*Primary Examiner* — Wei Zhao
(74) *Attorney, Agent, or Firm* — Fogg & Powers LLC (57) ABSTRACT

A circuit for use within a distributed antenna system includes: demodulators configured to generate respective frequency-shifted downlink signals from a carrier of a plurality of carriers included within a broadband downlink signal received at the circuit, each of the frequency-shifted downlink signals having a respective frequency shift from a frequency of the carrier, wherein the respective frequency shift is based on a bandwidth of a narrowband channel associated with the carrier, and filters communicatively coupled to the demodulators and configured to output a set of narrowband downlink signals, wherein each of the filters has a passband corresponding to the bandwidth of the carrier and is configured to generate a respective narrowband downlink signal of the set of narrowband downlink signals by filtering a respective one of the frequency-shifted downlink signals.

20 Claims, 6 Drawing Sheets

Related U.S. Application Data (60) Provisional application No. 61/939,445, filed on Feb. 13, 2014.

(56) References Cited

U.S. PATENT DOCUMENTS

| | | | |
|---|---|---|---|
| 6,963,552 B2 | 11/2005 | Sabat, Jr. et al. | |
| 7,761,093 B2 | 7/2010 | Sabat, Jr. et al. | |
| 7,920,858 B2 | 4/2011 | Sabat, Jr. et al. | |
| 8,160,570 B2 | 4/2012 | Sabat, Jr. et al. | |
| 8,290,483 B2 | 10/2012 | Sabat, Jr. et al. | |
| 8,559,939 B2 | 10/2013 | Sabat, Jr. et al. | |
| 9,136,998 B2 * | 9/2015 | Che | H04L 5/001 |
| 9,179,321 B2 | 11/2015 | Hasarchi et al. | |
| 9,438,318 B2 | 9/2016 | Hanson et al. | |
| 9,680,556 B2 * | 6/2017 | Lange | H04B 7/155 |
| 9,813,274 B2 | 11/2017 | Hanson et al. | |
| 2009/0154621 A1 | 6/2009 | Shapira et al. | |
| 2012/0281654 A1 * | 11/2012 | Aiba | H04L 5/0007 370/329 |
| 2012/0314797 A1 | 12/2012 | Kummetz et al. | |
| 2012/0321314 A1 | 12/2012 | Oren et al. | |
| 2013/0121703 A1 | 5/2013 | Kummetz et al. | |
| 2014/0036780 A1 | 2/2014 | Sabat, Jr. et al. | |
| 2014/0153536 A1 * | 6/2014 | Ouchi | H04W 52/146 370/329 |

OTHER PUBLICATIONS

United States Patent and Trademark Office, "Office Action", "From U.S. Appl. No. 14/540,375", dated Sep. 1, 2016, pp. 1-11, Published in: US.

International Search Authority, "International Search Report and Written Opinion for PCT Application No. PCT/US2014/065344", "from Foreign Counterpart of U.S. Appl. No. 14/540,375", dated Mar. 16, 2015, pp. 1-13, Published in: WO.

International Search Authority, "International Preliminary Report on Patentability from PCT Application No. PCT/US2014/065344", "from Foreign Counterpart of U.S. Appl. No. 14/540,375", dated Aug. 25, 2016, pp. 1-10, Published in: WO.

Keld Lange, "Practical Use of Noise Reduction With the Help of Microphone Arrays", 1998, pp. 1-168, Publisher: English Translation.

* cited by examiner

NARROWBAND SIGNAL TRANSPORT SUB-SYSTEM FOR DISTRIBUTED ANTENNA SYSTEM

CROSS-REFERENCE TO RELATED APPLICATIONS

This application is a continuation of U.S. application Ser. No. 14/540,375, filed Nov. 13, 2014 and titled "Narrowband Signal Transport Sub-System for Distributed Antenna System", which claims the benefit of U.S. Provisional Application Ser. No. 61/939,445, filed Feb. 13, 2014 and titled "Transport of Narrowband Signals for Intelligent Distributed Antenna System," each of which are hereby incorporated by reference.

TECHNICAL FIELD

The present disclosure relates generally to telecommunication systems and more particularly (although not necessarily exclusively) to a narrowband signal transport sub-system for distributed antenna systems and other telecommunication systems.

BACKGROUND

A distributed antenna system ("DAS") can include one or more master units or other head-end units and multiple remote units coupled to each master unit. A DAS can be used to extend wireless coverage in an area. Master units can be communicatively coupled to base stations. A master unit can receive downlink signals from the base station and distribute downlink signals as broadband signals in an analog or digital format to a radio frequency distribution system, which can include one or more remote units. The remote units can transmit the downlink signals to user equipment within coverage areas serviced by the remote units.

SUMMARY

According to one aspect, a narrowband signal transport sub-system for a distributed antenna system is provided. The narrowband signal transport sub-system includes filter banks that are communicatively coupled to a port of a unit in the distributed antenna system. The input port can receive a broadband downlink signal that includes signal components for multiple carriers. The filter banks can generate sets of narrowband downlink signals from the broadband downlink signal. Each set of narrowband downlink signals can correspond to one of the carriers. Each filter bank can include demodulators and filters. The demodulators can generate frequency-shifted downlink signals having respective frequency shifts from a frequency of one of the carriers. Each frequency shift can be based on a respective bandwidth for the carrier. Each of the filters in a filter bank can have a passband corresponding to the bandwidth of a narrowband channel associated with the carrier. Each filter can generate a respective narrowband downlink signal by filtering one of the frequency-shifted downlink signals.

According to another aspect, a method is provided for generating narrowband signals from a multicarrier signal communicated via a distributed antenna system. The method can involve receiving a broadband downlink signal that includes signal components for carriers. The method can also involve, for each of the carriers, generating a set of frequency-shifted downlink signals having respective frequency shifts from a frequency of the carrier. Each of the frequency shifts can be determined based on a bandwidth for the carrier. The method can also involve generating narrowband downlink signals by filtering the frequency-shifted downlink signals. The narrowband downlink signals can be obtained from the frequency-shifted downlink signals using filters having respective passbands corresponding to the bandwidth of a narrowband channel associated with the carrier.

According to another aspect, a distributed antenna system is provided that can generate narrowband signals from a multicarrier broadband signal. The distributed antenna system can include a unit that can be communicatively coupled to one or more remote units in the DAS and communicatively coupled to one or more base stations. The unit can receive a broadband downlink signal that includes signal components for multiple carriers. The unit can also generate, for each of the carriers, a set of frequency-shifted downlink signals having respective frequency shifts from a frequency of the carrier. Each of the frequency shifts can be determined based on a bandwidth for the carrier. The unit can also narrowband downlink signals by filtering the frequency-shifted downlink signals. The narrowband downlink signals can be obtained from the frequency-shifted downlink signals using filters having respective passbands corresponding to bandwidths of narrowband channels associated with the carriers.

These illustrative aspects and features are mentioned not to limit or define the disclosure, but to provide examples to aid understanding of the concepts disclosed in this application. Other aspects, advantages, and features of the present disclosure will become apparent after review of the entire application.

DETAILED DESCRIPTION

Certain aspects and features relate to a narrowband signal transport sub-system for a distributed antenna system ("DAS"). The narrowband signal transport sub-system can extract narrowband downlink signals from a broadband downlink signal that includes multiple carriers. Splitting or otherwise separating a broadband input signal into multiple narrowband signals can increase the degree to which other signal processing devices in a signal path improve the quality of signals transmitted by the remote units.

In some aspects, a narrowband signal transport sub-system can include filter banks in a unit of a DAS. The filter banks can be communicatively coupled to a port that receives multicarrier broadband downlink signals. The filter banks can generate sets of narrowband downlink signals that correspond to one or more of the carriers in the broadband downlink signal. For example, the filter banks can generate a set of narrowband downlink signals for a given carrier by generating a set of frequency-shifted versions of the downlink signal and filtering frequencies outside a bandwidth portion for a narrowband channel associated with the carrier.

In some aspects, each filter bank of the narrowband signal transport sub-system can include demodulators and filters. The demodulators can generate frequency-shifted downlink signals having respective frequency shifts from a frequency of one of the carriers. Each frequency shift can be selected based on a respective bandwidth for the carrier. For example, each of the frequency-shifted downlink signals can be frequency shifted by a portion of a carrier bandwidth that is selected using a suitable step width. The step width can be a difference in frequencies between adjacent narrowband signals in the set of narrowband downlink signals. In some aspects, a step width can be selected that minimizes a ripple in a passband for the set of narrowband downlink signals outputted by the filter bank. The filters in a filter bank can each have a passband corresponding to the bandwidth of a narrowband channel associated with the carrier. Each filter can generate a respective narrowband downlink signal by filtering one of the frequency-shifted downlink signals.

In some aspects, the narrowband signal transport sub-system can include one or more devices in a remote unit of the DAS. A remote unit can include modulators for up-converting the narrowband downlink signals. The remote unit can also include a combiner that combines the sets of narrowband downlink signals into a combined broadband downlink signal. In some aspects, a unit of the DAS can include decimators for down-sampling narrowband downlink signals for transport to a remote unit. The remote unit can include interpolators for up-sampling narrowband downlink signals received from the unit.

The use of narrowband signals can improve signal processing functions in a DAS. For example, using narrowband signals can facilitate the DAS in muting unwanted elements in bundled narrowband signals (e.g., by not transporting unused narrowband frequencies, by attenuating unused narrowband frequencies, etc.). Using the narrowband signals can also facilitate the DAS in detecting traffic loads by monitoring narrowband signals. Using the narrowband signals can also facilitate detecting the position of specific user equipment in a coverage zone serviced by the distributed antenna system.

A broadband signal can include a combined set of multiple signals transported over multiple frequency channels. A broadband signal can include signal components from multiple signals from different telecommunications operators. A broadband signal can also include signals communicated using different types of telecommunication technologies, such as (but not limited to) Universal Mobile Telecommunications System ("UMTS") technologies, Global System for Mobile Communications ("GSM") technologies, Long Term Evolution ("LTE") technologies, code division multiple access ("CDMA") technologies, etc.

In some aspects, the broadband signal can include modulated carriers. A modulated carrier can be a signal that has been modulated with voice or information data. Multiple carriers can be summed or otherwise combined into a combined broadband signal for transmission to a receiving device. An example of a carrier is a modulated waveform used for conveying or otherwise communicating a physical channel. For example, in a 3GPP compliant telecommunication system, a physical channel in a frequency division duplex mode can be defined by a code, a frequency and, in the uplink, a relative phase, and a physical channel in a time division duplex mode can be defined by a code, a frequency, and a time slot.

In some aspects, a narrowband signal can be a signal that is transmitted over a channel having a sufficiently narrow bandwidth that the signal has a flat or substantially flat frequency response. For example, a narrowband signal having a smaller bandwidth than a narrowband channel can be transmitted using the narrowband channel bandwidth such that the narrowband signal can pass through the channel without distortion.

A remote unit can include, for example, a device that includes or is communicatively coupled to one or more antennas and that can be configured to wirelessly receive downlink signals from a base station and to wirelessly receive uplink signals from terminal devices (e.g., mobile communication devices). A non-limiting example of a remote unit is a universal access point ("UAP"). In some aspects, a remote unit can be communicatively coupled (e.g., via an optical fiber) to a unit of the DAS, such as a master unit, that receives broadband signal from a base station or other signal provider device in a telecommunication system.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

Figure 1:
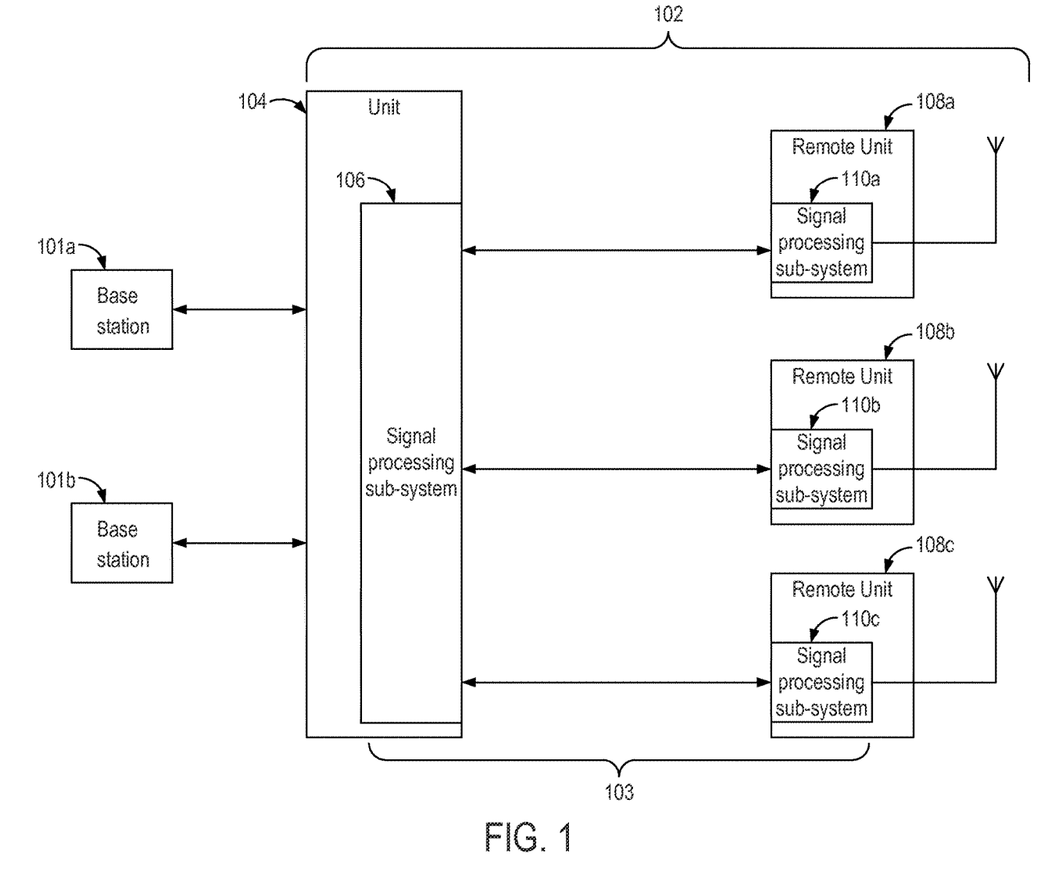
FIG. 1 is a block diagram depicting an example of a distributed antenna system ("DAS") that can include a narrowband signal transport sub-system according to one aspect of the present disclosure.

FIG. 1 is a block diagram depicting an example of a DAS 102 that can include a narrowband signal transport sub-system. The DAS 102 can communicate signals between one or more base stations 101a, 101b or other transceiving devices in communication with the DAS 102 (e.g., repeaters) and terminal devices (i.e., electronic devices used to communicate voice and/or data via a telecommunications system) in one or more coverage zones serviced by the DAS 102. The DAS 102 can communicate these signals via a unit 104 (e.g., a master unit or base station router) and remote units 108a, 108b, 108c that service one or more coverage zones. The remote units 108a, 108b, 108c can include remote antenna units or other devices that can include or be communicatively coupled to one or more antennas. Remote units 108a, 108b, 108c can be configured to wirelessly communicate signals with terminal devices.

The unit 104 can receive downlink signals from the base stations 101a, 101b and transmit uplink signals to the base stations 101a, 101b. The unit 104 can include multiple input ports for receiving downlink signals. At each port, the unit 104 can receive downlink signals having frequencies in frequency bands that are used by multiple telecommunications operators. Each telecommunications operator can communicate signals using one or more types of telecommunications technology (e.g., GSM, UMTS, LTE, CDMA, etc.).

Any suitable communication link can be used for communication between the base stations 101a, 101b and a unit 104. A suitable communication link can be a wired connection or a wireless connection. A wired connection can include, for example, a connection via a copper cable, an optical fiber, or another suitable communication medium. A wireless connection can include, for example, a wireless RF communication link or a microwave link.

The remote units 108a, 108b, 108c can provide signal coverage in respective coverage zones. Providing signal coverage in the coverage zones can include transmitting downlink signals received from the unit 104 to terminal devices in the coverage zones. Providing signal coverage in the coverage zones can also include receiving uplink signals from the mobile communication devices or other terminal devices in the coverage zones. The remote units 108a, 108b, 108c can transmit the uplink signals to the unit 104.

In some aspects, the unit 104 can be a master unit or other suitable unit that can communicate with one or more base stations 101a, 101b or other transceiving devices in communication with the DAS 102. A master unit can include, for example, an optical transceiver that transmits optical signals to remote units in a DAS. The master unit or other suitable unit 104 can communicate with remote units 108a, 108b, 108c in different coverage zones of the same DAS 102. In additional or alternative aspects, the unit 104 can be included in a base station router or other suitable unit that can communicate signals between one or more base stations 101a, 101b and one or more master units.

The DAS 102 can include a narrowband signal transport sub-system 103. The narrowband signal transport sub-system 103 can include one or more components of a signal processing sub-system 106 of the unit 104. In some aspects, the narrowband signal transport sub-system 103 can also include one or more components of signal processing sub-systems 110a, 110b, 110c of the respective remote units 108a, 108b, 108c.

The narrowband signal transport sub-system 103 can obtain narrowband downlink signals from a broadband downlink signal received by the unit 104 from one or more of the base stations 101a, 101b. For example, the narrowband signal transport sub-system 103 can split or otherwise separate a multicarrier downlink signal into sets of narrowband downlink signals. Each set of narrowband downlink signals can correspond to one of the carriers in the broadband downlink signal. Splitting or otherwise separating a broadband input signal into multiple narrowband signals can improve the ability of subsequent signal processing stages in the DAS 102 to process the various narrowband signals and improve the quality of signals transmitted by the remote units 108a, 108b, 108c.

Although FIG. 1 depicts a direct connection between the unit 104 and the remote units 108a, 108b, 108c, other implementations are possible. In some aspects, the unit 104 can be connected to the remote units 108a, 108b, 108c via one or more extension units or other intermediate devices.

Although FIG. 1 depicts one unit 104 and three remote units 108a-c, a DAS 102 can include any number of units 104 and any number of remote units.

Figure 2:
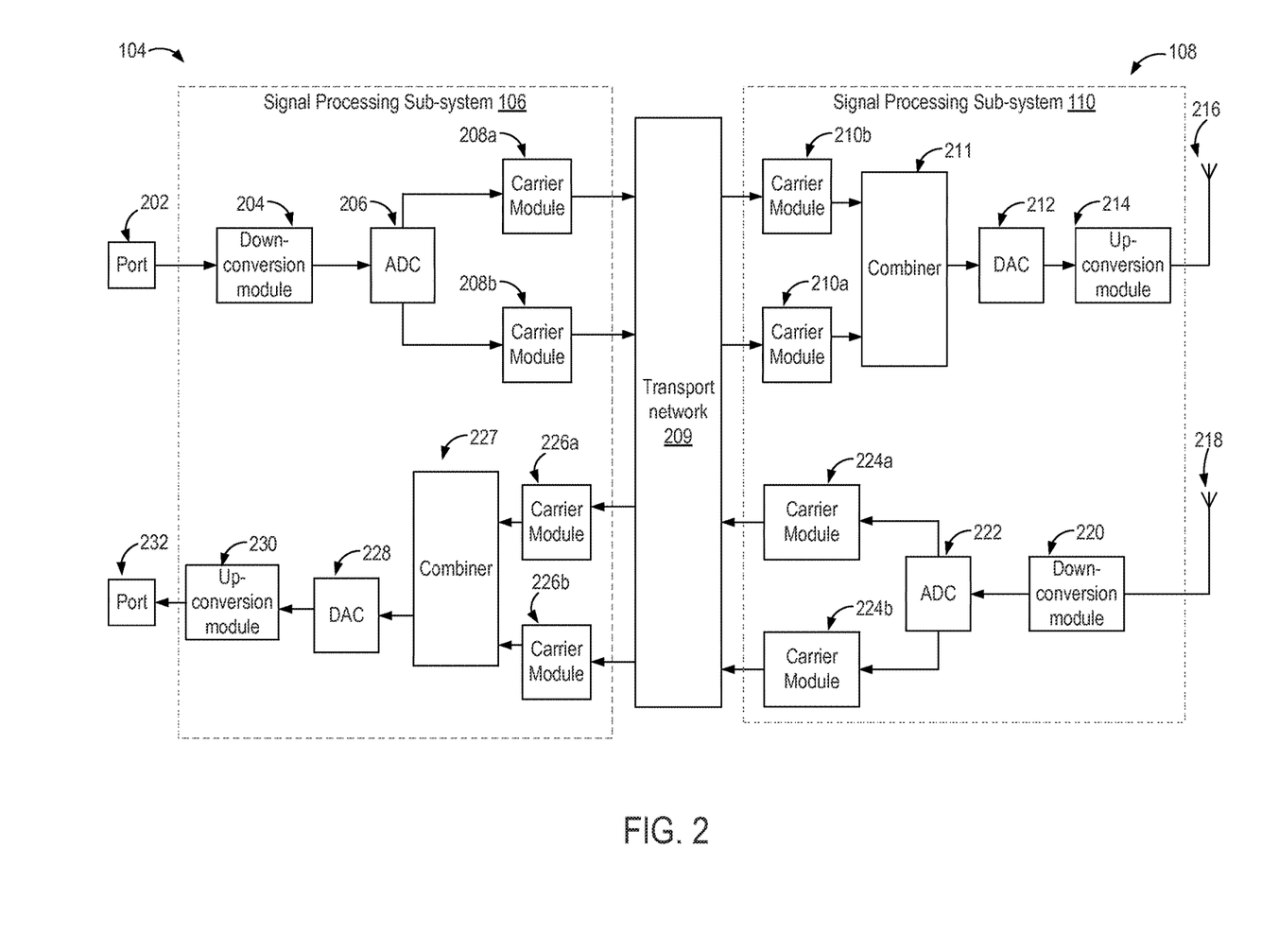
FIG. 2 is a block diagram depicting examples of signal processing sub-systems included in units of a DAS having the narrowband signal transport sub-system of FIG. 1 according to one aspect of the present disclosure.

FIG. 2 is a block diagram depicting examples of signal processing sub-systems 106, 110 that are respectively included in a unit 104 and a remote unit 108 of a DAS 102 having the narrowband signal transport sub-system 103. In some aspects, the signal processing sub-system 106 can include multiple devices or other components that are implemented in a donor card of unit 104. The signal processing sub-system 106 can include devices included in a remote unit 108.

The signal processing sub-systems 106, 110 can process multicarrier signals with via the DAS 102. For example, a donor card of the unit 104 may include a signal processing sub-system 106 that can support multiple carriers that use different bandwidths. Non-limiting examples of different carriers include GSM carriers with frequency hopping, LTE carriers, UMTS carriers, etc.

As depicted in FIG. 2, a downlink path can include a signal path from an input port 202 of the unit 104 to a transmit antenna 216 of the remote unit 108. In a downlink direction, input signals received via a port 202 can be provided to the signal processing sub-system 106. For example, the port 202 can be an antenna port or other port configured to receive RF downlink signals or other input signals. The input signals may include, for example, broadband downlink signals. In the example depicted in FIG. 2, the signal processing sub-system 106 includes a down-conversion module 204, an analog-to-digital converter ("ADC") 206, and carrier modules 208a, 208b. In some aspects, the down-conversion module 204 can include, for example, a mixer, a local oscillator, and a bandpass filter or other suitable filter. The mixer and a local oscillator can down-convert multicarrier downlink signals (e.g., RF downlink signals) to an intermediate frequency ("IF"). The bandpass filter can filter the IF multicarrier downlink signal. The ADC 206 can convert the multicarrier downlink signal to a digital multicarrier downlink signal. In some aspects involving a zero-IF implementation, dual channel ADCs can be used. The carrier modules 208a, 208b can split or otherwise separate the multicarrier downlink signal for transmission to remote units. For example, each of the carrier modules 208a, 208b can include one or more demodulators, each of which can be communicatively coupled to one or more bandpass filters or other suitable filters. The demodulators and filters can split the multicarrier downlink signal into multiple downlink signals corresponding to respective carriers.

Although the example FIG. 2 depicts an implementation using IF conversion, other implementations are possible. For example, in some aspects, the narrowband signal transport sub-system 103 can be utilized in a DAS 102 that is at least partially configured for zero-IF operation. For example, in some aspects involving a zero-IF implementation, the down-conversion module 204 can include an I/Q demodulator. In additional or alternative aspects involving a direct conversion implementation, high speed ADCs, DACs that can operate at RF can be utilized in place of the ADC 206 and DAC 228 and a down-conversion module 204 can be omitted.

The signal processing sub-system 106 of the unit 104 can communicate with the signal processing sub-system 110 of the remote unit 108 via a transport network 209. In the downlink direction, the signal processing sub-system 110 depicted in FIG. 2 includes carrier modules 210a, 210b, a combiner 211, a digital-to-analog converter ("DAC") 212, and an up-conversion module 214. One or more of the carrier modules 210a, 210b can include devices for processing the narrowband downlink signals received from a unit 104. A combiner 211 (e.g., an adder) can be used to combine sets of narrowband downlink signals into one or more combined broadband downlink signals. A broadband downlink signal can be converted to an analog signal by the DAC 212 and up-converted to RF by the up-conversion module 214. Downlink signals or other input signals outputted by the signal processing sub-system 110 can be transmitted to one or more terminal devices via the antenna 216.

As depicted in FIG. 2, an uplink path can include a signal path from a receive antenna 218 of the remote unit 108 to an output port 232 of the unit 104. In an uplink direction, RF signals or other uplink signals received via an antenna 218 can be provided to the signal processing sub-system 110. In the uplink direction, the signal processing sub-system 110 depicted in FIG. 2 includes a down-conversion module 220, an ADC 222, and carrier modules 224a, 224b. The signal processing sub-system 106 includes carrier modules 226a, 226b, a combiner 227, a DAC 228, and an up-conversion module 230. Output signals from the signal processing sub-system 110 can be transmitted to one or more signal providers via a port 232. For example, the port 232 can be an antenna port or other port configured to transmit RF uplink signals or other output signals to a base station or other signal provider.

In the uplink direction, uplink signals received by the antenna 218 can be down-converted to IF using the down-conversion module 220. The ADC 222 can convert the IF uplink signals into digital uplink signals. The carrier modules 224a, 224b can include demodulators and filters for generating narrowband uplink signals for transmission to the unit 104. The narrowband uplink signals can be generated in a manner similar to that described above with respect to generating narrowband downlink signals. One or more devices in signal processing chains used to generate narrowband uplink signals can be configured with different parameter values as compared to signal processing chains used to generate narrowband downlink signals. Suitable parameter values can be selected based on requirements or conditions in the downlink direction and the uplink direction.

The carrier modules 226a, 226b can process the narrowband uplink signals received from the remote unit 108. The signal processing sub-system 106 can use a combiner 227 (e.g., a summer) to combine multiple uplink signals for respective carriers into a digital multicarrier uplink signal. The DAC 228 can convert the combined multicarrier uplink signal into an analog multicarrier uplink signal. In some aspects, a bandpass or other filter in the uplink path (e.g., in the up-conversion module 230) can reconstruct the analog signal. The up-conversion module 230 (e.g., a mixer and local oscillator) can up-convert the analog uplink signal to RF. The RF multicarrier uplink signal can be provided to a base station or other signal provider via the output port 232.

For illustrative purposes, FIG. 2 depicts specific devices in the signal processing sub-systems 106, 110. However, other implementations are possible. For example, in some aspects, additional signal processing devices may be included in one or both of the signal processing sub-systems 106, 110. In other aspects, one or both of the signal processing sub-systems 106, 110 may omit one or more of the signal processing devices depicted in FIG. 2.

In some aspects, one or more components depicted in FIG. 2 can be combined or omitted. In one example, the antennas 216, 218 can include the same devices or group of devices. In some aspects, a duplexer or other device that is communicatively coupled to the antenna or group of antennas can isolate uplink signals from downlink signals. In other aspects (e.g., in a time-division duplexing system), an antenna of a remote unit 108 can be switched between an uplink mode and a downlink mode. In another example, the ports 202, 232 can be the same port. In some aspects, a duplexer or other device that is communicatively coupled to the port can isolate uplink signals from downlink signals. In other aspects (e.g., in a time-division duplexing system), a port of a unit 104 can be switched between an uplink mode and a downlink mode.

Figure 3:
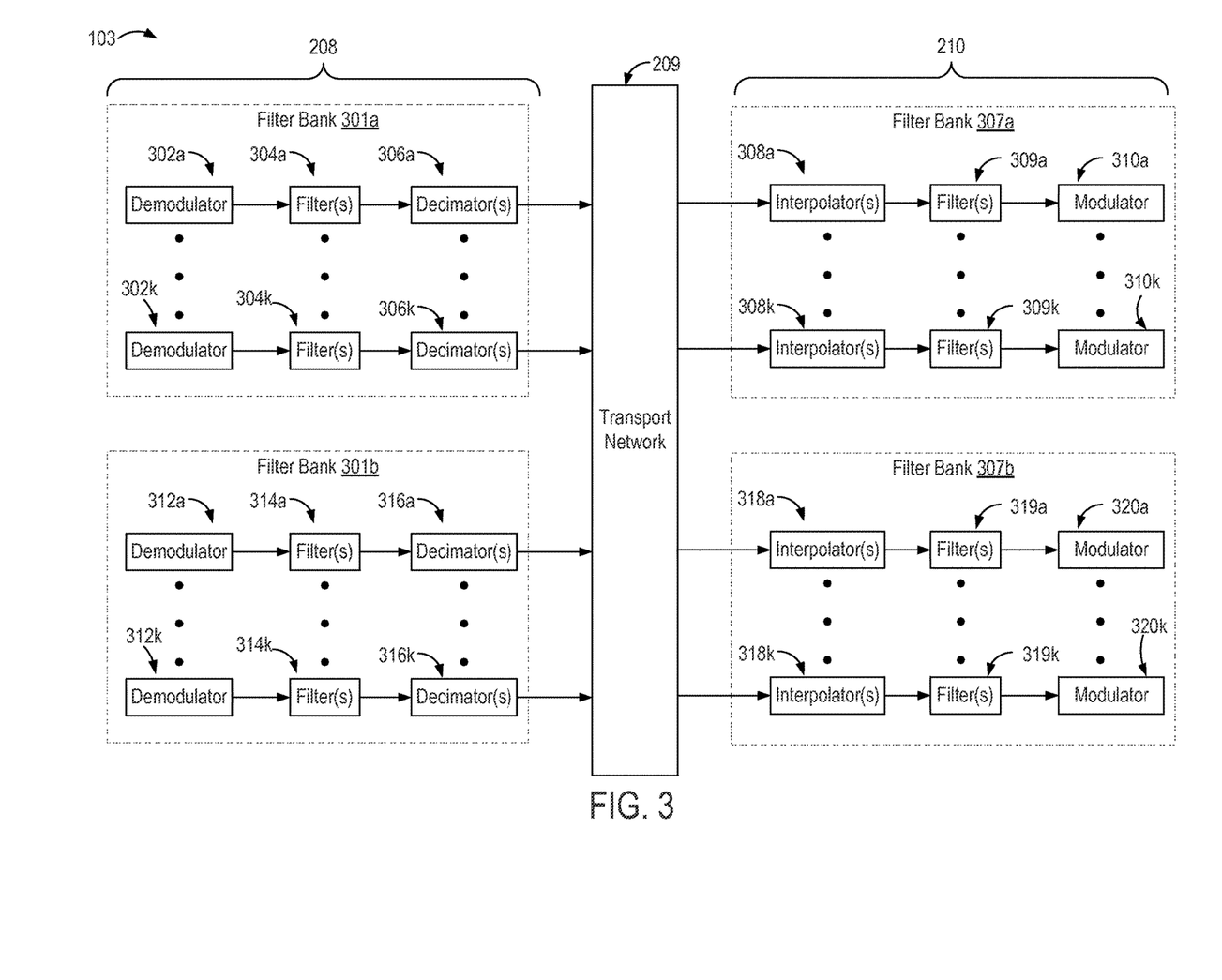
FIG. 3 is a block diagram that depicts an example of an implementation of the narrowband signal transport sub-system that includes filter banks for obtaining sets of narrowband signals according to one aspect of the present disclosure.

FIG. 3 is a block diagram that depicts an example of an implementation of the narrowband signal transport sub-system 103 using filter banks 301a, 301b for obtaining sets of narrowband signals. For illustrative purposes, FIG. 3 depicts two filter banks 301a, 301b. However, other implementations are possible. A narrowband signal transport sub-system 103 can include any number of filter banks in a carrier module 208.

The unit 104 can use the filter banks 301a, 301b to generate narrowband downlink signals from multicarrier input signals. For example, a signal processing sub-system 106 (e.g., a donor card in a unit 104) can receive a multicarrier downlink signal via the input port 202. The signal processing sub-system 106 can split or otherwise separate the received multicarrier downlink signal into multiple narrowband downlink signals. In some aspects, each narrowband downlink signal can be digitally represented as a complex baseband signal with a reduced sampling rate.

Different sets of the narrowband downlink signals can represent respective carriers. A set of the narrowband downlink signals can represent a modulated waveform that corresponds to channels for any other suitable telecommunication technology. For example, a first set of the narrowband downlink signals can represent a modulated waveform corresponding to Evolved Universal Terrestrial Radio Access ("E-UTRA") frequency channels. A second set of the narrowband downlink signals can represent a modulated waveform corresponding to GSM channels. A third set of the narrowband downlink signals can represent a modulated waveform corresponding to CDMA channels.

The filter bank 301a can include multiple signal paths that respectively include demodulators 302a-k, filters 304a-k (e.g., bandpass filters), and decimators 306a-k. The filter bank 301b can include multiple signal paths that respectively include demodulators 312a-k, filters 314a-k (e.g., bandpass filters), and decimators 316a-k.

A multicarrier downlink signal received from an ADC 206 can be provided to one or more of the filter banks 301a, 301b. In some aspects, the multicarrier downlink signal can be converted to IF signal by the down-conversion module 204 prior to being provided to one or more of the filter banks 301a, 301b. In other aspects involving a zero-IF implementation, a multicarrier RF downlink signal provided to one or more of the filter banks 301a, 301b. Each of the filter banks 301a, 301b can be configured to output m narrowband downlink signals. Each of the m narrowband downlink signals can have the same bandwidth. A set of m narrowband downlink signals outputted by one of the filter banks 301a, 301b can correspond to a given carrier.

As depicted in FIG. 3, each of the filter banks 301a, 301b can include a set of k complex de-modulators (i.e., demodulators 302a-k, 312a-k). Each complex demodulator can output a frequency-shifted version of the multicarrier downlink signal by performing a complex demodulation on the multicarrier downlink signal. The output of each complex demodulator can be a respective complex baseband signal. For example, each of the demodulators 302a-k, 312a-k can include two mixers and a 90-degree splitter that can be used to output an IQ signal (i.e. a complex baseband signal). Each complex baseband signal can be used to obtain a respective narrowband downlink signal. The group of complex demodulators for each of the filter banks 301a, 301b can be used to output a set of narrowband downlink signals that are equally spaced in a frequency band.

The frequency shift performed by each of k complex demodulators can be represented by the function $$f_n + k \frac{BW_n}{m_n}.$$

The term $f_n$ represents the lowest frequency component of a signal corresponding to a given carrier. The term $BW_n$ represents the useful signal bandwidth of a complex narrowband signal. The term $m_n$ represents a step width for adjacent narrowband signals. The step width can be a difference in frequencies for adjacent narrowband signals. The step width can define an amount of overlap ratio between adjacent narrowband signals. In some aspects, the step width can be selected to provide, for example, a 50% overlap between narrowband signals in the frequency band of interest. In other aspects, other amounts of overlap can be used. In some aspects, one of the complex demodulators may not shift the frequency of the received carrier.

The output of the complex demodulators can be a set of frequency-shifted downlink signals. For example, the demodulators 302a-k can receive a carrier having a frequency $f_1$. The complex demodulators can be configured to use a bandwidth $BW_1$ and a step width of $m_1$. A first one of the demodulators 302a-k can output the carrier signals without a frequency shift (i.e. with the frequency $f_1$). A second one of the demodulators 302a-k can generate a frequency-shifted downlink signal with a frequency of $$f_1 + \frac{BW_1}{m_1}.$$

A third one of the demodulators 302a-k can generate a frequency-shifted downlink signal with a frequency of $$f_1 + \frac{2BW_1}{m_1}.$$

The filter banks 301a, 301b can respectively include filters 304a-k, 314a-k. The filters 304a-k, 314a-k can be implemented in any manner suitable for extracting or otherwise obtaining sets of narrowband signals from the received downlink signals. In some aspects, the filters 304a-k, 314a-k can be implemented in a manner suitable for use with complex signal representations. In other aspects, the filters 304a-k, 314a-k can be implemented in a manner suitable for use with real signal representations. In some aspects involving complex signal representations, the filters 304a-k, 314a-k can be lowpass filters. In other aspects, the filters 304a-k, 314a-k can be bandpass filters.

The filters 304a-k, 314a-k can receive respective frequency-shifted downlink signal from the demodulators 302a-k, 312a-k. Each of the filters 304a-k, 314a-k for a given one of the filter banks 301a, 301b can be configured with the same passband with the bandwidth $BW_n$. Each of the filters 304a-k, 314a-k can be, for example, a bandpass filter having a center frequency that is the same as or otherwise corresponds to a center frequency of each frequency shifted signal.

Each of the filter banks 301a, 301b can include decimators 306a-k, 316a-k respectively following the filters 304a-k, 314a-k. Each of the decimators 306a-k, 316a-k can decimate a respective narrowband downlink signal to reduce the sampling rate of the narrowband downlink signal. Reducing the sampling rate of the narrowband downlink signals can allow the set of narrowband downlink signals to be compressed. In some aspects, reducing the sampling rate of the narrowband downlink signals can allow a number of bits used for each complex sample to be minimized (e.g., due to a reduced dynamic range of the narrowband signals, due to introducing a different number format such as a complex mantissa and a real exponent, etc.).

The narrowband signal transport sub-system 103 can also include filter banks 307a, 307b. The filter bank 307a can include interpolators 308a-k, filters 309a-k (e.g., bandpass filters), and modulators 310a-k. The filter bank 307b can include interpolators 318a-k, filters 319a-k (e.g., bandpass filters), and modulators 320a-k.

Each of the interpolators 308a-k, 318a-k can interpolate a respective narrowband downlink signal. Interpolating a narrowband downlink signal to increase the sampling rate of the narrowband downlink signal. Each of the filters 309a-k, 319a-k can reconstruct a respective narrowband downlink signal after interpolation. Each of the modulators 310a-k, 320a-k can up-convert a respective narrowband downlink signal. A set of narrowband downlink signals can be combined to generate a combined by the combiner 211 to generate a multicarrier downlink signal.

In some aspects, decimating and interpolating the narrowband downlink signals can cause noise to be added to the narrowband downlink signal. The additional noise can cause increase the error vector magnitude ("EVM") and out-of-band emissions for the downlink signals. In some aspects, the additional noise can be minimized or otherwise reduced by selecting appropriate filter characteristics for the filters 304a-k, 314a-k in the unit 104. In additional or alterative aspects, the additional noise can be minimized or otherwise reduced by selecting an appropriate sampling rate used by the decimators 306a-k, 316a-k for decimating the narrowband downlink signals. In additional or alterative aspects, the additional noise can be minimized or otherwise reduced by selecting appropriate filter characteristics for the filters 309a-k, 319a-k in the remote unit 108.

In some aspects, the decimators 306a-k, 316a-k and interpolators 308a-k, 318a-k can be omitted.

In some aspects, one or more of the filter banks 301a, 301b, 307a, 307b can be implemented using a processing device that can execute suitable program code. Non-limiting examples of a processing device include a microprocessor, an application-specific integrated circuit ("ASIC"), a field-programmable gate array ("FPGA"), or other suitable processing device. The processing device may include any number of processors, including one. The program code can be stored in any non-transitory computer-readable medium capable of tangibly embodying executable instructions and can include electronic, magnetic, or optical devices. Examples of a non-transitory computer-readable medium include random access memory ("RAM"), read-only memory ("ROM"), magnetic disk, an ASIC, a configured processor, or other storage device.

FIGS. 2 and 3 depict examples of digital implementations of the narrowband signal transport sub-system 103. However, other implementations are possible. For example, in some aspects, one or more components of the filter banks 301a, 301b, 307a, 307b can be implemented using analog devices. In additional or alternative aspects, the narrowband signal transport sub-system 103 can be implemented using real signal representations. In additional or alternative aspects, the narrowband signal transport sub-system 103 can be implemented for using complex signal representations (e.g., one or more devices for implementing zero-IF direct conversion).

Figure 4:
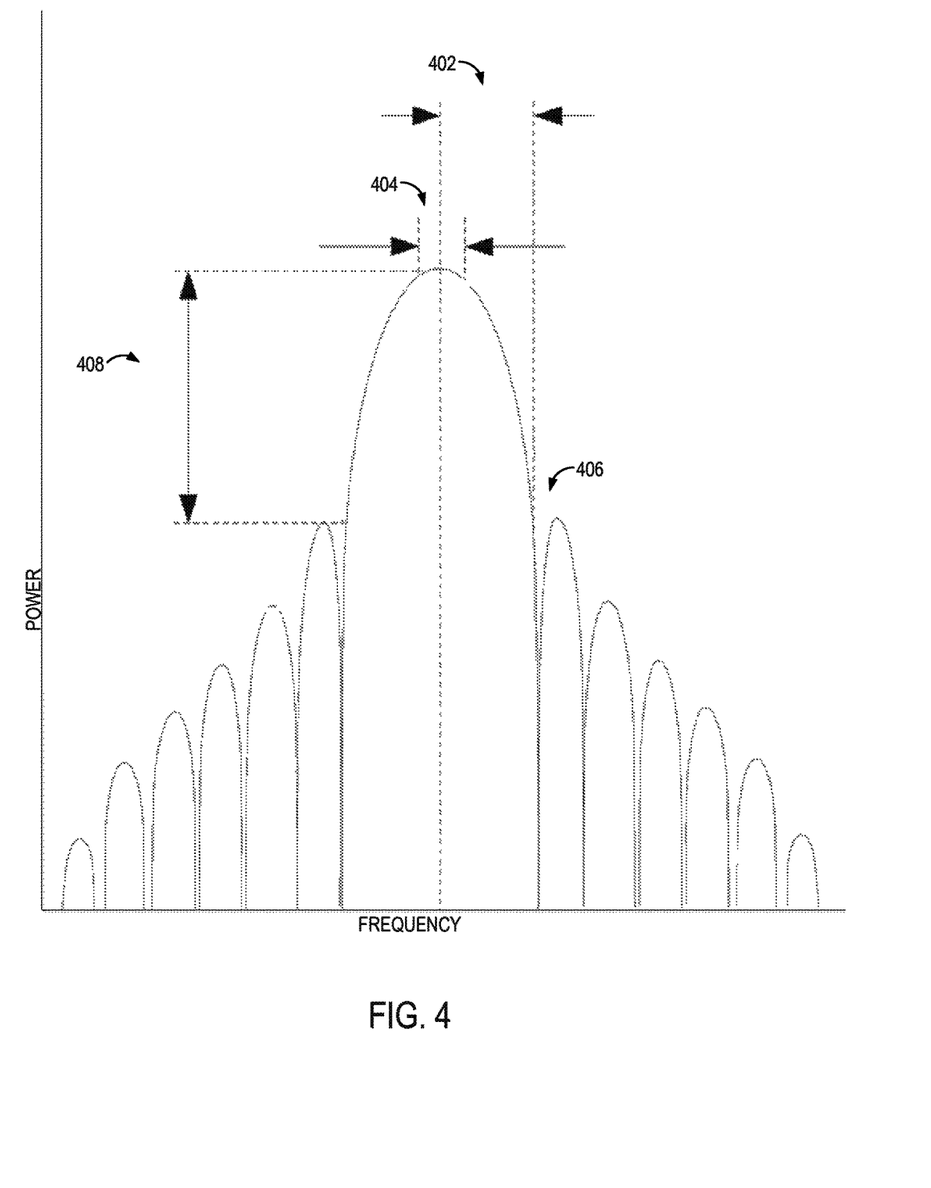
FIG. 4 is a diagram depicting examples of frequency components for a signal outputted by a filter of the narrowband signal transport sub-system depicted in FIG. 3 according to one aspect of the present disclosure.

FIG. 4 is a diagram depicting examples of frequency components for a narrowband signal outputted by a filter of the narrowband signal transport sub-system 103. The components of the narrowband signal include the useful bandwidth 402, a passband 404 includes the portion of the lobe having a 3 dB magnitude, and a stopband 406. The narrowband signal can exhibit minimal side lobe attenuation 408.

FIG. 4 depicts the characteristics associated with a lowpass filter. The impulse response of the example depicted in FIG. 4 is an infinite length Sin(x)/x impulse response of an ideal flat channel multiplied with a finite length Hanning window. This windowing operation can allow for the implementation of the flat channel filter by a finite FIR.

In some aspects, a frequency response of a lowpass filter can be suitable for a fast Fourier transform ("FFT") based implementation of the filter banks depicted in FIG. 3. An FFT-based implementation can require fewer processing resources as compared to a bank of time-domain FIR Filters.

Figure 5:
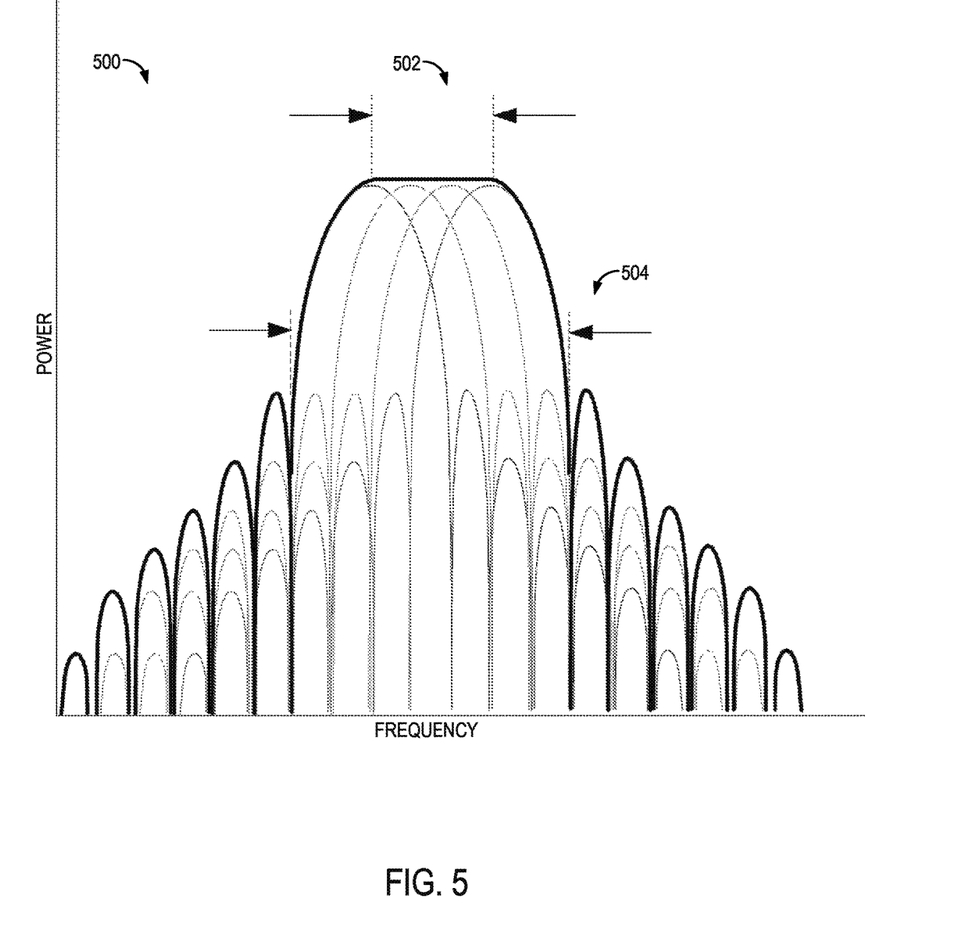
FIG. 5 is a diagram depicting examples of frequency components for a set of narrowband signals outputted by a set of filter banks of the narrowband signal transport sub-system depicted in FIG. 3 according to one aspect of the present disclosure.

FIG. 5 is a diagram depicting examples frequency components for a set of narrowband signals 500 outputted by a set of filter banks of the narrowband signal transport sub-system 103. A combined filter characteristic similar to the depiction in FIG. 5 can be obtained by bundling adjacent narrowband signals. Each of the filters 304a-k, 314a-k in the respective filter banks 301a, 301b can be selected or configured to satisfy one or more criteria used to obtain a desirable filter characteristic of the set of narrowband signals 500.

In some aspects, each of the filters 304a-k, 314a-k can be selected or configured such that a respective set of narrowband signals 500 outputted by each of the filter banks 301a, 301b has a flat passband characteristic for the passband 502. Selecting or configuring each of the filters 304a-k, 314a-k can include selecting a filter or configuring a filter with a suitable passband. For example, a filter can be selected or configured to obtain the flat passband characteristic. Such a filter can provide a rectangular frequency response. A corresponding impulse response can be a Sin(x)/x response having an infinite length. As depicted in FIG. 5, the flat passband characteristic for a set of narrowband downlink signals 500 can include having a set of center lobes with frequencies close to one another. The flat passband characteristic may decrease the ripple in the passband 502.

In additional or alternative aspects, each of the filters 304a-k, 314a-k in the respective filter banks 301a, 301b can be selected or configured such that the stopband attenuation in the stopband 504 for a set of narrowband signals 500 is reasonable. For example, a reasonable stopband attenuation can be obtained in cases where a total stopband signal power of the narrowband signal corresponds to EVM requirements at the middle frequency of a carrier (e.g. >30 dBc). Each of the filters 304a-k, 314a-k can also be selected or configured such that the stopband attenuation at an adjacent carrier is high (e.g. >70 dBc in 1 MHz distance).

In additional or alternative aspects, each of the filters 304a-k, 314a-k in the respective filter banks 301a, 301b can be selected or configured such that the useful signal bandwidth corresponding to minimum sampling rate is small. For example, the stopband 504 of the set of narrowband signals depicted in FIG. 5 may be steeper than a corresponding stopband for a broadband downlink signal.

In additional or alternative aspects, each of the filters 304a-k, 314a-k in the respective filter banks 301a, 301b can be selected or configured such that the performance of a reconstruction filter (e.g., one of the filters 309a-k, 319a-k) is satisfactory. For example, the performance of a reconstruction filter may be satisfactory if the remaining signal power of the images in the up-sampled and filtered narrowband signal is sufficiently low. For example, different portions of the signal processing chain can contribute to the EVM of an output signal at an antenna port. A target EVM may be 5% to 8%. A reconstruction filter having satisfactory performance can involve the EVM of the reconstructed signal being 3% or less.

Figure 6:
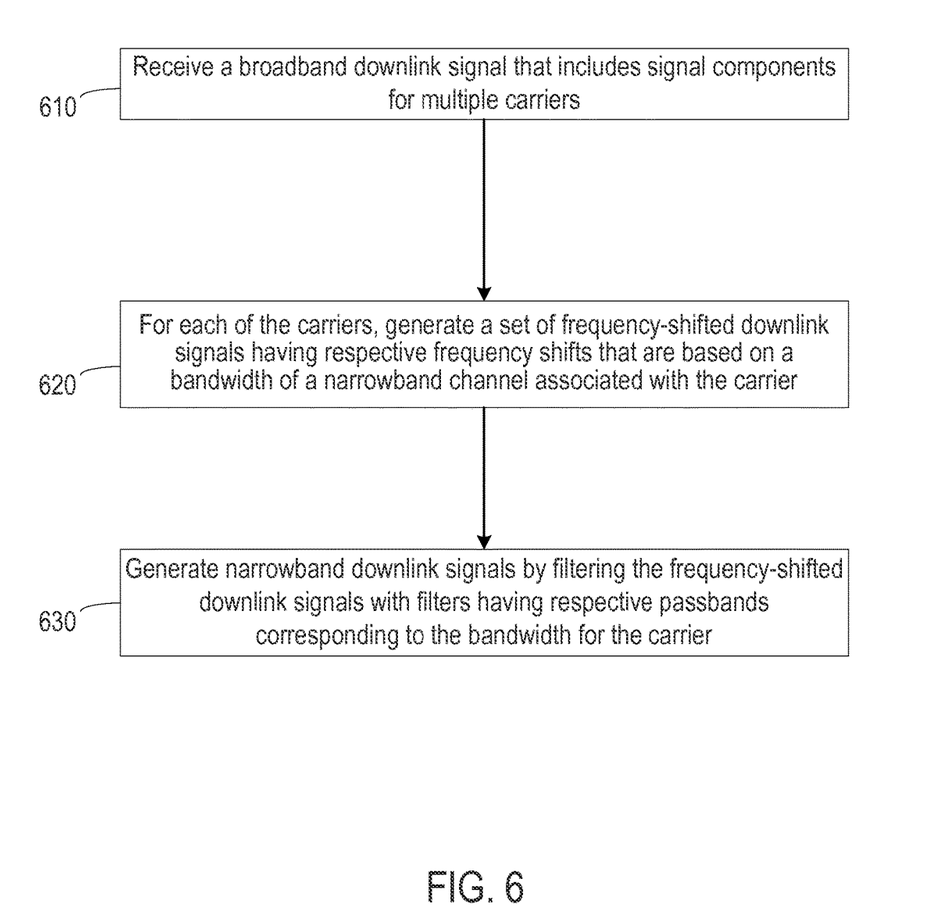
FIG. 6 is a flow chart depicting an example of a process for generating narrowband signals for communication via a DAS according to one aspect of the present disclosure.

FIG. 6 is a flow chart depicting an example of a process 600 for generating narrowband signals for communication via a DAS 102. The process 600 is described with respect to one or more of the aspects and examples described above with respect to FIGS. 1-5. Other implementations, however, are possible.

The process 600 involves receiving a broadband downlink signal that includes signal components for carriers, as depicted in block 610. For example, a unit 104 of the DAS 102 can receive a broadband downlink signal via a port 202.

The process 600 also involves generating a set of frequency-shifted downlink signals having respective frequency shifts from a frequency of the carrier, where each of the frequency shifts is determined based on a bandwidth for the carrier, as depicted in block 620. For example, one or more of the sets of demodulators 302a-k, 312a-k can generate frequency shifted versions of a received downlink signal, as described above with respect to FIG. 3. In some aspect, each frequency shift can be selected based on the bandwidth of a given carrier divided by a step width. The step width can be a difference in frequency between adjacent narrowband signals. The step width may be selected such that a ripple in a passband for a set of the narrowband downlink signals is minimized, as described above with respect to FIG. 6.

The process 600 also involves generating narrowband downlink signals by filtering the frequency-shifted downlink signals with filters having respective passbands corresponding to bandwidths of narrowband channels associated with the carriers, as depicted in block 630. For example, one or more of the sets of filters 304a-k, 314a-k can filter the frequency shifted versions of the downlink signal, as described above with respect to FIGS. 3 and 4. In some aspects, the narrowband downlink signals can be decimated by one or more sets of the decimators 306a-k, 316a-k in the unit 104, as described above with respect to FIG. 3. The decimated narrowband downlink signals received by a remote unit 108 can be interpolated using one or more of the sets of interpolators 308a-k, 318a-k.

While the present subject matter has been described in detail with respect to specific aspects and features thereof, it will be appreciated that those skilled in the art, upon attaining an understanding of the foregoing may readily produce alterations to, variations of, and equivalents to such aspects and features. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A circuit for use within a distributed antenna system, the circuit comprising:
    demodulators configured to generate respective frequency-shifted downlink signals from a carrier of a plurality of carriers included within a broadband downlink signal received at the circuit, each of the frequency-shifted downlink signals having a respective frequency shift from a frequency of the carrier, wherein the respective frequency shift is based on a bandwidth of a narrowband channel associated with the carrier, and filters communicatively coupled to the demodulators and configured to output a set of narrowband downlink signals, wherein each of the filters has a passband corresponding to the bandwidth of the carrier and is configured to generate a respective narrowband downlink signal of the set of narrowband downlink signals by filtering a respective one of the frequency-shifted downlink signals.

2. The circuit of claim 1, wherein each frequency shift is based on the bandwidth divided by a step width, the step width comprising a difference in frequency between adjacent narrowband downlink signals in the set of narrowband downlink signals.

3. The circuit of claim 2, wherein the circuit is configured such that the step width minimizes a ripple in an additional passband for the set of narrowband downlink signals.

4. The circuit of claim 1, wherein each of the filters comprises a respective bandpass filter having a respective center frequency corresponding to a respective additional center frequency of the respective frequency-shifted downlink signal.

5. The circuit of claim 1, further comprising decimators that are communicatively coupled to the filters, wherein each decimator is configured to reduce a sampling rate of a respective narrowband downlink signal outputted from a respective one of the filters.

6. The circuit of claim 1, wherein the circuit is included in a master unit that is configured to communicate signals between base stations and remote units of the distributed antenna system.

7. The circuit of claim 1, further comprising modulators configured to up-convert respective narrowband downlink signals from the set of narrowband downlink signals.

8. The circuit of claim 7, further comprising decimators configured to reduce a sampling rate of the set of narrowband downlink signals outputted by the filters, wherein the additional filter bank comprises interpolators configured to increase the sampling rate of the set of narrowband downlink signals.

9. The circuit of claim 7, further comprising a combiner configured to combine the set of narrowband downlink signals into a combined broadband downlink signal.

10. A method for generating narrowband signals from a multicarrier signal communicated via a distributed antenna system, the method comprising:

generating respective frequency-shifted downlink signals having respective frequency shifts from a frequency of a carrier of a plurality of carriers included within a broadband downlink signal received at the circuit, wherein each of the frequency shifts is determined based on a bandwidth of a narrowband channel associated with the carrier, and generating narrowband downlink signals by filtering the frequency-shifted downlink signals using filters having respective passbands corresponding to the bandwidth for the carrier.

11. The method of claim 10, wherein each frequency shift is based on the bandwidth of the carrier divided by a step width, wherein the step width comprises a difference in frequency between adjacent narrowband downlink signals.

12. The method of claim 11, further comprising selecting the step width such that a ripple in an additional passband for a set of the narrowband downlink signals is minimized.

13. The method of claim 10, wherein each of the filters comprises a respective bandpass filter having a respective center frequency corresponding to a respective additional center frequency of the respective frequency-shifted downlink signal.

14. The method of claim 10, further comprising reducing a sampling rate of the narrowband downlink signals and transmitting the narrowband downlink signals to a remote unit of the distributed antenna system.

15. The method of claim 14, further comprising increasing, by the remote unit, the sampling rate of the received narrowband downlink signals.

16. The method of claim 15, further comprising combining, by the remote unit, the narrowband downlink signals into a combined broadband downlink signal.

17. A distributed antenna system, the distributed antenna system comprising:

a remote unit; and an antenna unit comprising filters having respective passbands corresponding to bandwidths for carriers, the antenna unit configured to be communicatively coupled to the remote unit and a base station, the antenna unit configured to:

generate respective frequency-shifted downlink signals having respective frequency shifts from a frequency of a carrier of a plurality of carriers included within a broadband downlink signal received at the circuit, wherein each of the frequency shifts is determined based on a bandwidth of a narrowband channel associated with the carrier; and generate narrowband downlink signals by filtering the frequency-shifted downlink signals using filters having respective passbands corresponding to the bandwidth for the carrier.

18. The distributed antenna system of claim 17, wherein the antenna unit is configured with the frequency shift such that the frequency shift is based on the bandwidth of the carrier divided by a step width, wherein the step width comprises a difference in frequency between adjacent narrowband downlink signals.

19. The distributed antenna system of claim 18, wherein the antenna unit is configured with the frequency shift such that a ripple in an additional passband for a set of the narrowband downlink signals is minimized.

20. The distributed antenna system of claim 17, wherein each of the filters comprises a respective bandpass filter having a respective center frequency corresponding to a respective additional center frequency of the respective frequency-shifted downlink signal.

* * * * *